United States Patent
Jaiswal et al.

(10) Patent No.: US 7,921,195 B2
(45) Date of Patent: Apr. 5, 2011

(54) OPTIMIZING SERVICE PROCESSING BASED ON BUSINESS INFORMATION, OPERATIONAL INTELLIGENCE, AND SELF-LEARNING

(75) Inventors: Peeyush Jaiswal, Boca Raton, FL (US); Arun Kumar Thakore, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 12/135,459

(22) Filed: Jun. 9, 2008

(65) Prior Publication Data
US 2009/0307298 A1 Dec. 10, 2009

(51) Int. Cl.
G06F 15/173 (2006.01)
(52) U.S. Cl. .......................... 709/223; 709/217; 709/225
(58) Field of Classification Search .......... 709/202–203, 709/205, 217–219, 229, 249, 206, 223, 225
See application file for complete search history.

(56) References Cited

U.S. PATENT DOCUMENTS

| | | | |
|---|---|---|---|
| 7,209,921 B2 | 4/2007 | Pace et al. |
| 7,209,988 B2 | 4/2007 | Chalopin et al. |
| 7,209,993 B2 | 4/2007 | Kitamura et al. |
| 7,216,204 B2 | 5/2007 | Rosenbluth et al. |
| 7,219,196 B2 | 5/2007 | Adamo et al. |
| 7,221,377 B1 | 5/2007 | Okita et al. |
| 7,225,103 B2 | 5/2007 | Beresniewicz et al. |
| 7,228,401 B2 | 6/2007 | Moyer |
| 7,228,404 B1 | 6/2007 | Patel et al. |
| 7,228,426 B2 | 6/2007 | Sinha et al. |
| 7,228,434 B2 | 6/2007 | Zisowski |
| 7,234,037 B2 | 6/2007 | Errickson et al. |
| 7,234,139 B1 | 6/2007 | Feinberg |
| 7,237,036 B2 | 6/2007 | Boucher et al. |
| 7,240,228 B2 | 7/2007 | Bear et al. |
| 7,240,331 B2 | 7/2007 | Vion-Dury et al. |
| 7,240,343 B2 | 7/2007 | Ogasawara |
| 7,242,991 B2 | 7/2007 | Budinger et al. |
| 7,243,335 B1 | 7/2007 | Andrew et al. |
| 7,246,182 B2 | 7/2007 | Forin et al. |
| 7,246,197 B2 | 7/2007 | Rosenbluth et al. |

(Continued)

OTHER PUBLICATIONS

Notification of Transmittal of the International Search Report and the Written Opinion of the International Searching Authority, or the Declaration for PCT EP2009/056215, Sep. 15, 2009.

*Primary Examiner* — Kevin Bates
*Assistant Examiner* — Oleg Survillo
(74) *Attorney, Agent, or Firm* — Yee & Associates, P.C.; John R. Pivnichny

(57) ABSTRACT

A mechanism for using information in an execution context and other information to optimally select a business service implementation and service execution path. Responsive to receiving a request for a service from a service requester, an execution context is created, wherein the execution context comprises information about business aspects and operational aspects of the service being requested. The request is sent with the execution context to a next component in the service request/response flow in the service oriented architecture. Responsive to the next component receiving the request, current execution context information about the service is obtained based on a current processing of the request for the service and historical execution context information about the service based on previous processing of requests for the service. A service execution decision is then made based on the current execution context information and the historical execution context information.

16 Claims, 4 Drawing Sheets

U.S. PATENT DOCUMENTS

| | | | |
|---|---|---|---|
| 7,249,211 B2 | 7/2007 | Wieland et al. | |
| 7,254,528 B2 | 8/2007 | Bowers et al. | |
| 7,254,806 B1 | 8/2007 | Yates, Jr. et al. | |
| 7,259,883 B2 | 8/2007 | Yamamoto | |
| 7,260,530 B2 | 8/2007 | Werner | |
| 7,260,698 B2 | 8/2007 | Hepkin | |
| 7,263,718 B2 | 8/2007 | O'Brien et al. | |
| 7,272,834 B2 | 9/2007 | Bauman et al. | |
| 7,275,239 B2 | 9/2007 | Cuomo et al. | |
| 7,275,246 B1 | 9/2007 | Yates, Jr. et al. | |
| 7,283,881 B2 | 10/2007 | Puryear | |
| 7,284,070 B2 | 10/2007 | Boucher et al. | |
| 7,296,257 B1 | 11/2007 | Dibble et al. | |
| 7,299,383 B2 | 11/2007 | David et al. | |
| 7,301,369 B2 | 11/2007 | Kanno et al. | |
| 7,302,686 B2 | 11/2007 | Togawa | |
| 7,305,500 B2 | 12/2007 | Adiletta et al. | |
| 7,310,634 B2 | 12/2007 | Zwiegincew et al. | |
| 7,313,449 B1 | 12/2007 | Ciolfi et al. | |
| 7,316,016 B2 | 1/2008 | DiFalco | |
| 7,316,021 B2 | 1/2008 | Joy et al. | |
| 7,318,090 B1 | 1/2008 | Fairman et al. | |
| 7,319,991 B2 | 1/2008 | Boutault | |
| 7,320,121 B2 | 1/2008 | Krueger | |
| 7,321,988 B2 | 1/2008 | Guo et al. | |
| 7,327,123 B2 | 2/2008 | Faberman et al. | |
| 7,328,195 B2 | 2/2008 | Willis | |
| 7,330,878 B2 | 2/2008 | Slavin et al. | |
| 7,334,056 B2 | 2/2008 | Ellis et al. | |
| 7,483,973 B2 * | 1/2009 | An et al. | 709/224 |
| 7,529,824 B2 * | 5/2009 | Joseph | 709/223 |
| 7,543,175 B2 * | 6/2009 | Wood et al. | 714/4 |
| 7,768,944 B2 * | 8/2010 | Hao et al. | 370/254 |
| 2007/0006120 A1 * | 1/2007 | Proebsting et al. | 717/101 |
| 2008/0140857 A1 * | 6/2008 | Conner et al. | 709/236 |
| 2009/0070456 A1 * | 3/2009 | Brown et al. | 709/224 |
| 2009/0287845 A1 * | 11/2009 | Joshi et al. | 709/238 |
| 2010/0191656 A1 * | 7/2010 | Martin et al. | 705/80 |

\* cited by examiner

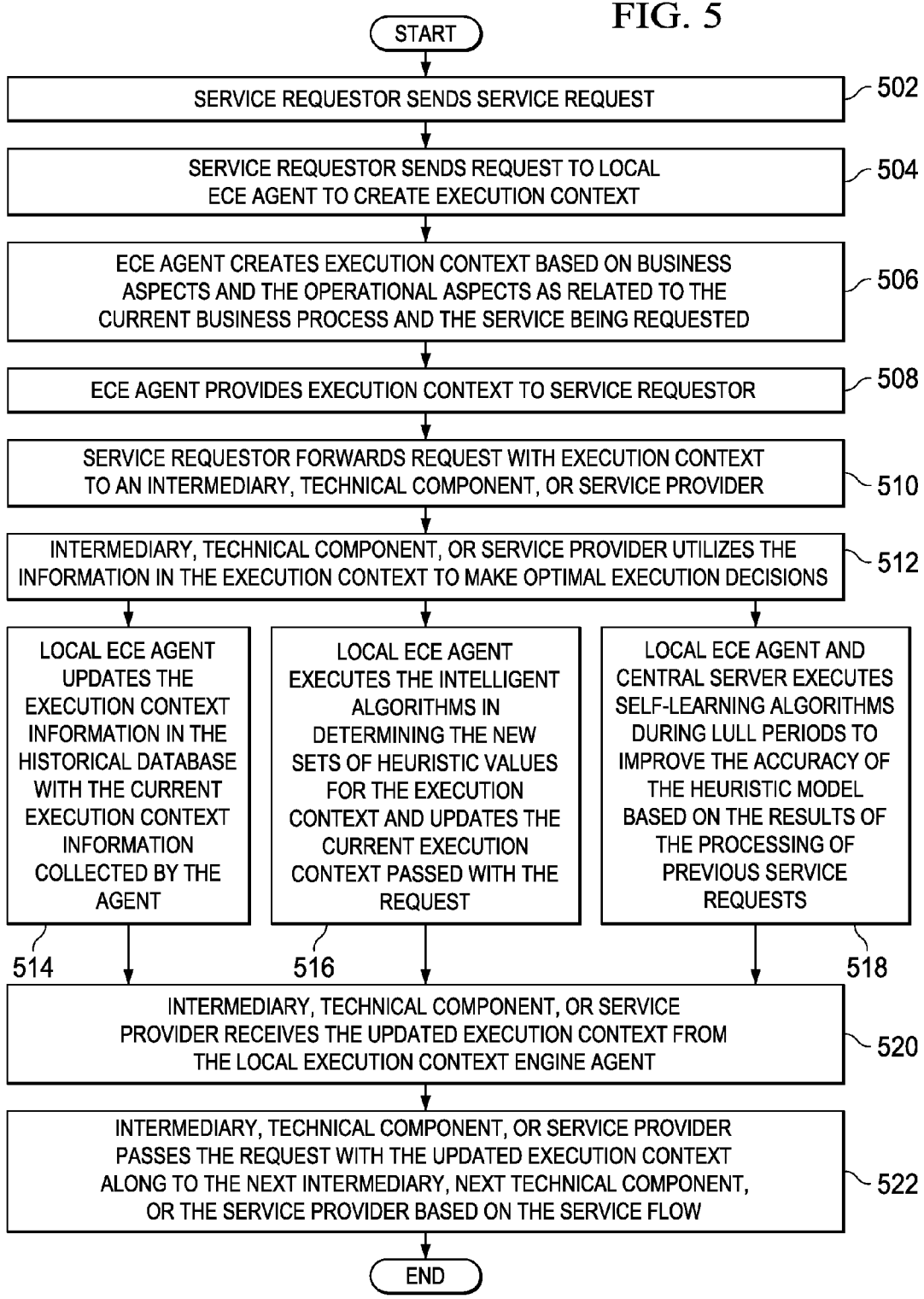

US 7,921,195 B2

OPTIMIZING SERVICE PROCESSING BASED ON BUSINESS INFORMATION, OPERATIONAL INTELLIGENCE, AND SELF-LEARNING

BACKGROUND OF THE INVENTION

1. Field of the Invention

Aspects of the present invention relate generally to an improved data and transaction processing system, and in particular to Service Oriented Architectures (SOAs). More specifically, the aspects of the present invention relate to optimally selecting a business service implementation and optimizing the service execution dynamically based on contextual information relating to the business, the operational environment, and self learning.

2. Description of the Related Art

A Service Oriented Architecture (SOA) is a collection of services that communicate with one another over a network in order to carry out business processes. Communication in a Service Oriented Architecture can involve the simple passing of data or can involve two or more services that coordinate some activity. Such services are loosely coupled (meaning that one application does not need to know the technical details of another application in order to communicate with the other application), have well-defined platform independent interfaces, and are reusable. In general, a service-oriented approach enables one or more businesses to link together fragmented data and business processes in order to create a more complete view of operations. For example, a retail business deciding whether to issue a credit card to a customer can use Service Oriented Architecture technology to tap different available sources to pull together information on the customer's credit worthiness and buying habits. A bank can use the same Service Oriented Architecture to handle account transfers whether they originate from a teller, an ATM or a Web application, thus avoiding the need for multiple applications. As yet another example, a manufacturer can effectively use a Service Oriented Architecture to measure a production process, and then make appropriate adjustments to the process that feeds back instantly to its chain of suppliers.

A service in a Service Oriented Architecture is a function which can be invoked via an implementation-independent interface. A service provider is an entity that offers a service to other entities, and an entity that makes use of a service by triggering its execution is a service requester. A Service Oriented Architecture provides flexibility by allowing a service requester to discover and invoke a service dynamically based on the pre-published service interface (i.e., the description of the functionality provided by the service). A service request may be processed by one of multiple possible service providers. An intermediary, such as an Enterprise Service Bus (ESB) or a business process engine, typically determines the particular service provider implementation to be used to process the request. A service provider implementation is a specific implementation of the service deployed for the request (e.g., usually a server program). The intermediary may select the particular service implementation to use based on business taxonomy and business rules. A business rule contains conditions and actions that apply to an organization to achieve its business goals. Business rules may include, for example, referential-integrity rules, application-behavior rules, transaction-processing business-logic rules, and data-entity processing rules, such as stored procedures.

BRIEF SUMMARY OF THE INVENTION

The illustrative embodiments provide a mechanism for using information in an execution context and other information to optimally select a business service implementation and service execution path. Responsive to receiving a request for a service from a service requester, an execution context is created, wherein the execution context comprises information about business aspects and operational aspects of the service being requested. The request is sent with the execution context to a next component in the service request/response flow in the service oriented architecture. Responsive to the next component receiving the request, current execution context information about the service is obtained based on a current processing of the request for the service and historical execution context information about the service based on previous processing of requests for the service. A service execution decision is then made based on the current execution context information and the historical execution context information.

BRIEF DESCRIPTION OF THE SEVERAL VIEWS OF THE DRAWINGS

FIG. 5 is a flowchart of a process for optimally selecting a business service implementation and optimizing the service execution dynamically based on an execution context in accordance with the illustrative embodiments.

DETAILED DESCRIPTION OF THE INVENTION

Figure 1:
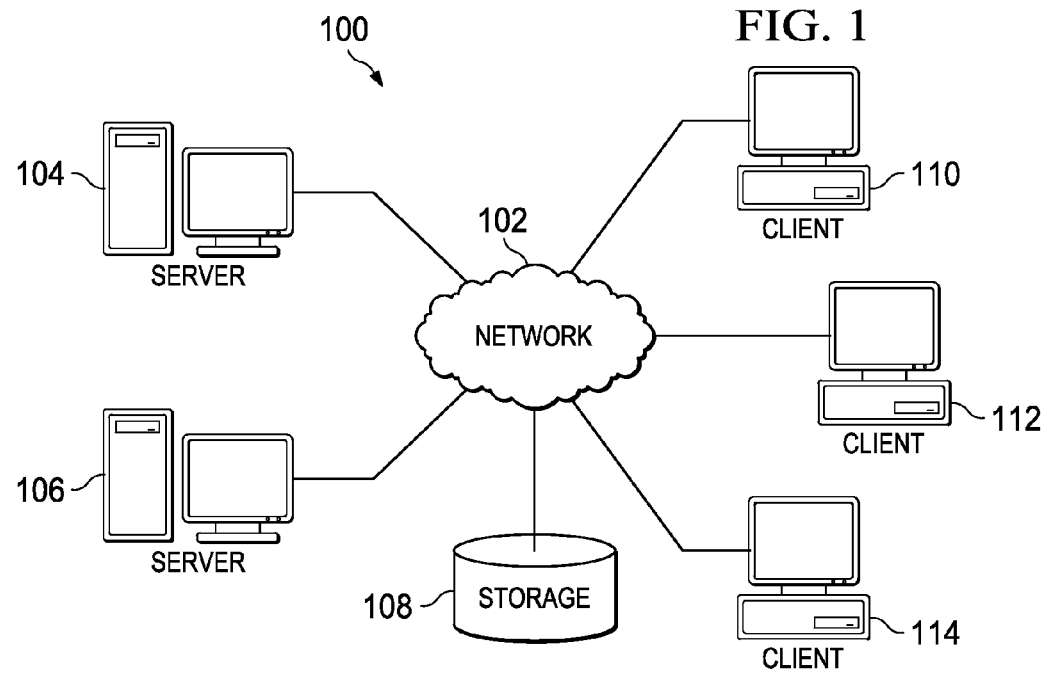
FIG. 1 depicts a pictorial representation of a distributed data processing system in which the illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, or semiconductor system, apparatus, device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable medium may be any medium that can contain or store the program for use by or in connection with the instruction execution system, apparatus, or device. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
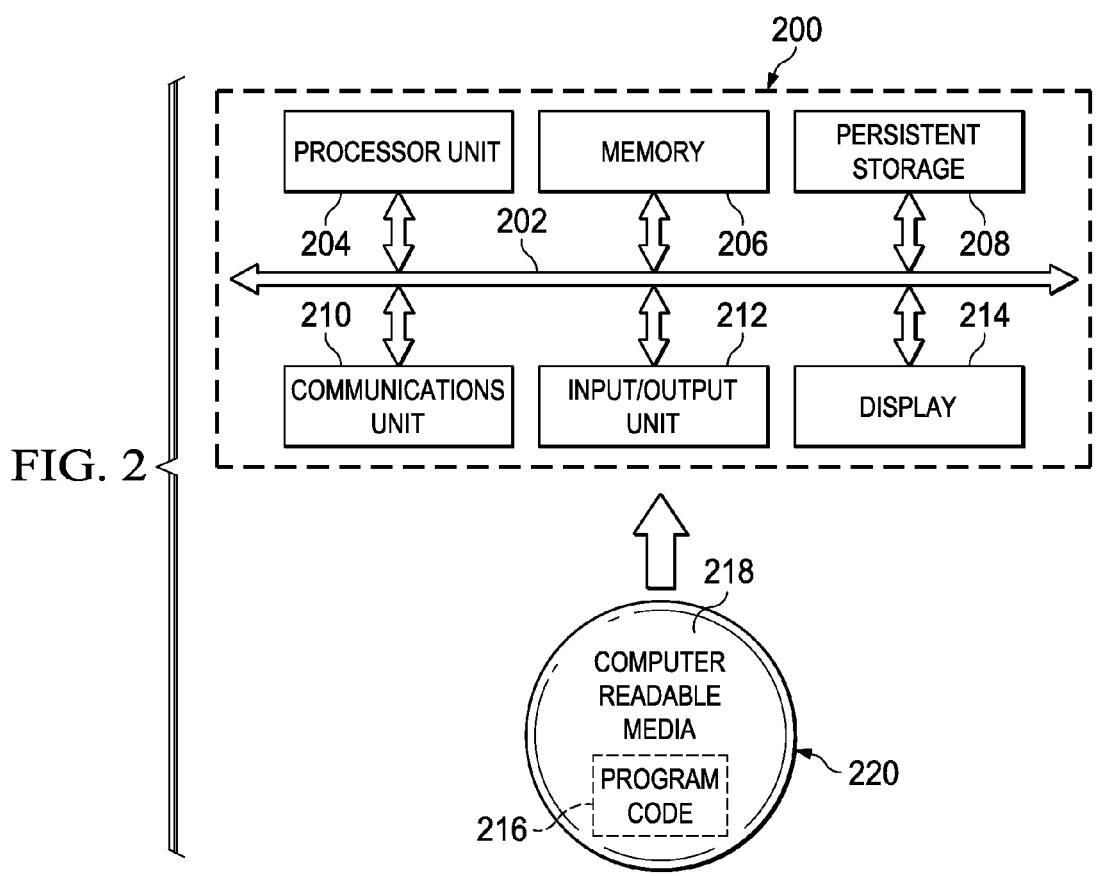
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
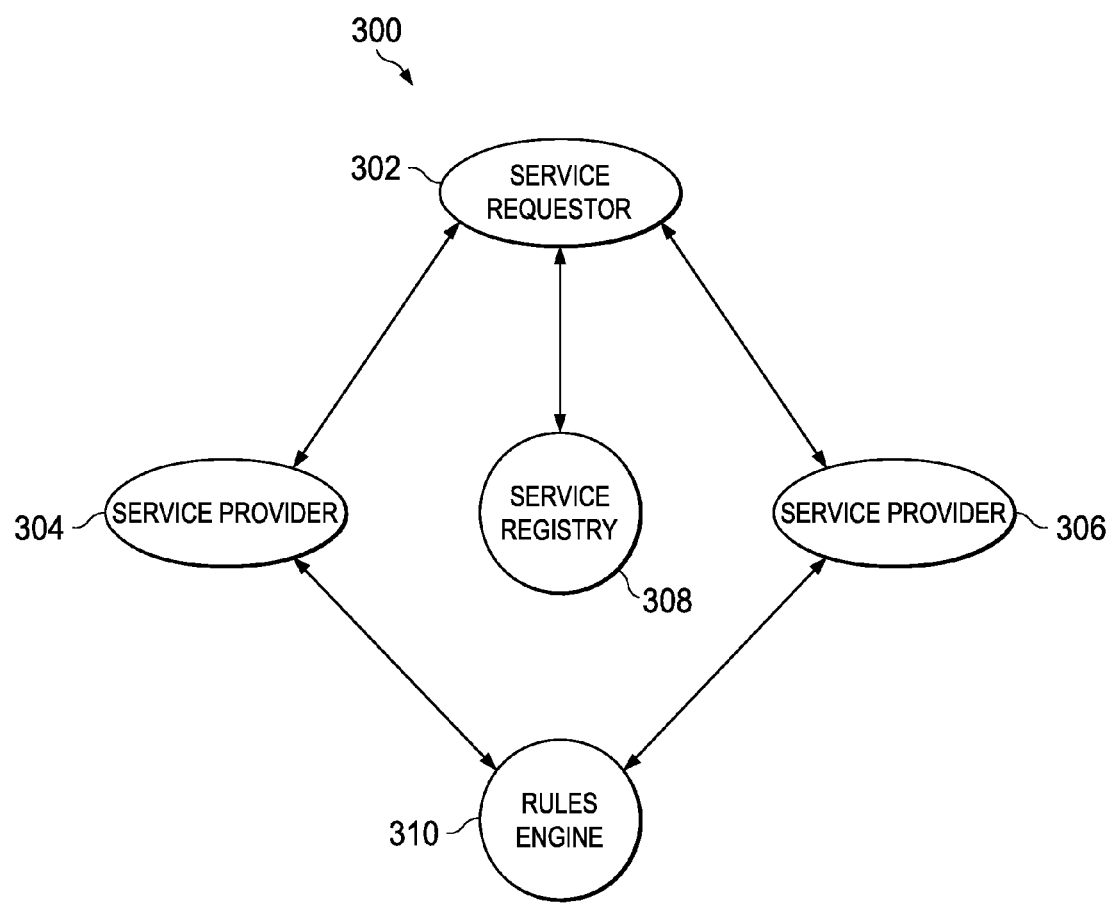
FIG. 3 is a high-level block diagram that schematically illustrates a basic Service Oriented Architecture to assist in explaining the exemplary embodiments.

FIG. 3 is a high-level block diagram that schematically illustrates a basic Service Oriented Architecture to assist in explaining the exemplary embodiments. The Service Oriented Architecture is a software architecture that is a platform independent collection of web services which are available to software applications and network end users. A web service is an interface that describes a collection of operations that are network accessible through standardized extensible markup language (XML) messaging. A web service fulfills a specific task or a set of tasks. A web service is described using a standard format XML notation called its service description, which provides all of the details necessary to interact with the service, including message formats, transport protocols, and location.

The Service Oriented Architecture is generally designated by reference number 300 and includes service requester 302 and service providers 304 and 306. Service requester 302 may be implemented, for example, as one of clients 110, 112 and 114 in FIG. 1; and service providers 304 and 306 may be implemented as servers 104 and 106 in FIG. 1. Service requester 302 dynamically discovers and invokes a published web service by sending a service request to web service provider 304 or 306. The service provider (304 or 306) receiving the request returns a response message to the service requester 302.

As shown in FIG. 3, Service Oriented Architecture 300 may also include service registry 308 that provides a directory or registry of services. A service requester, such as service requester 302, can dynamically discover and invoke services that are being offered by examining service registry 308.

Service Oriented Architecture 300 may also include rules engine 310 which comprises software for managing and automating business rules. Business rules describe the operations, definitions, and constraints that apply to an organization in achieving its goals. Rules engine 310 implements the business rules against particular facts received about the request from service providers 304 and 306. Service providers 304 and 306 may provide a particular service implementation to service requestor 302 based on the results in rules engine 310.

As previously mentioned, a service requester may discover and invoke a service dynamically based on a pre-published interface. In providing a service to the requester, service providers may also be expected to abide by requirements defined in service level agreements or other contractual agreements made between the service providers and customers. These service level agreements specify a minimum level of service performance and availability that the service provider will guarantee to the requester. However, if the IT infrastructure is under-provisioned, it can be challenging for a service provider to attain the specific service performance and availability levels specified in the service level agreements. During periods of saturation, even though an intermediary may select the appropriate service implementation to use during the service invocation based on the business taxonomy and business rules, customer satisfaction may suffer due to unavailability of the service or very long response times. As a consequence, additional components (e.g., load balancers) are often required to be added to the IT infrastructure to enable service providers to meet the required performance and availability levels.

In addition, the workload characteristics of the system may also be unpredictable and may often change within a given time frame (e.g., an hour, a day, a month, or a year). Thus, the design of the IT infrastructure is typically designed for the estimated peak workload of the system. However, an infrastructure design based on peak workload often causes high levels of under-utilization.

Furthermore, the business context may vary periodically. For example, certain hotel properties may decide not to participate in the booking process of the consolidator for the next few days and take advantage of increased revenue due to special events that are held within the city. Such dynamically changing business context itself may reduce the efficiency of the business process which executes steps that are not necessary for the final result.

Existing solutions address the need to provide acceptable service performance and availability by selecting a service provider implementation based on business taxonomy and business rules, as well as by providing load balancing based on the utilization of the service provider infrastructure. While these existing methods attempt at achieving business flexibility and improving service levels, these methods do not address the problem of ever-changing workloads and business context. In addition, these methods either cause under-utilization of system components and increased costs due to over provisioning of the infrastructure, or cause under-attainment of the service levels when under-provisioned.

The illustrative embodiments provide an improved mechanism for using information in an execution context and other information to optimally select a service provider implementation and the service execution path dynamically. An execution context engine comprising a central server and a set of distributed execution context engine agents is used to facilitate the collection and retention of the execution context information for business processes and services within those processes. When a service requester creates a service request, the local execution context engine agent located with the service requester creates an execution context for the request. The execution context comprises knowledge about both the business aspects and the operational aspects as related to the current business process and the services within the process being requested. Business aspects of a business process and its services comprise information that relate to the process steps, the business rules, and the metrics that govern the process. Operational aspects of a business process and service comprise information that relates to the execution time of the services, the load balancing options, and the delays introduced by the technical components within the processing paths. The execution context knowledge may include historical execution context information comprising business and operational information about the current business process and the service previously collected by agents within the system and stored in a database at the execution context engine central server, and current execution context information comprising business and operational information being collected by the agents as the service request/response flows through the infrastructure. The execution context is then passed with the service request (and with the service response) through various technical components in the IT infrastructure before the request arrives at a service provider for processing.

Furthermore, at each technical component, intermediary, or service provider in the request/response flow, a local execution context engine agent located with the technical component, intermediary, or service provider updates the execution context in the request/response. When the technical component, intermediary, or service provider receives the request, the technical component, intermediary, or service provider utilizes the execution context in the request to make optimal service execution or service provider implementation decisions. For instance, a service provider may decide to take a different execution path within its service provider implementation. A service provider may also decide to provide summary information with an indication that details about the elected objects can be obtained in subsequent calls if needed. An intermediary may decide to forward the request to a different service provider implementation. An aggregator technical component may decide to break the request into multiple parallel requests and assemble the result. Thus, an intermediary, service provider, or technical component performs a service execution decision or service provider implementation selection process based on the historical execution context information and current execution context information about the service being collected as the request/response flows through the infrastructure. Thus, as the business process and services within the process are executed, technical components and other components within the infrastructure may use and update the execution context dynamically to make optimal service execution decisions or select a service provider implementation. The execution context is manipulated by the components based on intelligence that is maintained in a distributed fashion throughout the execution environment.

The mechanism provided in the illustrative embodiments provides various advantages over existing methods for selecting a service provider implementation. The illustrative embodiments provide increased flexibility to a service oriented architecture based not only on using business knowledge to make service execution decisions, but also on using operational intelligence of the system to make service execution decisions. The illustrative embodiments allow the efficient use of the underlying infrastructure while allowing for higher probability and degree of attainment of the service levels. The illustrative embodiments also provide higher customer satisfaction due to providing improved service levels and higher contextual focus in the service execution.

Figure 4:
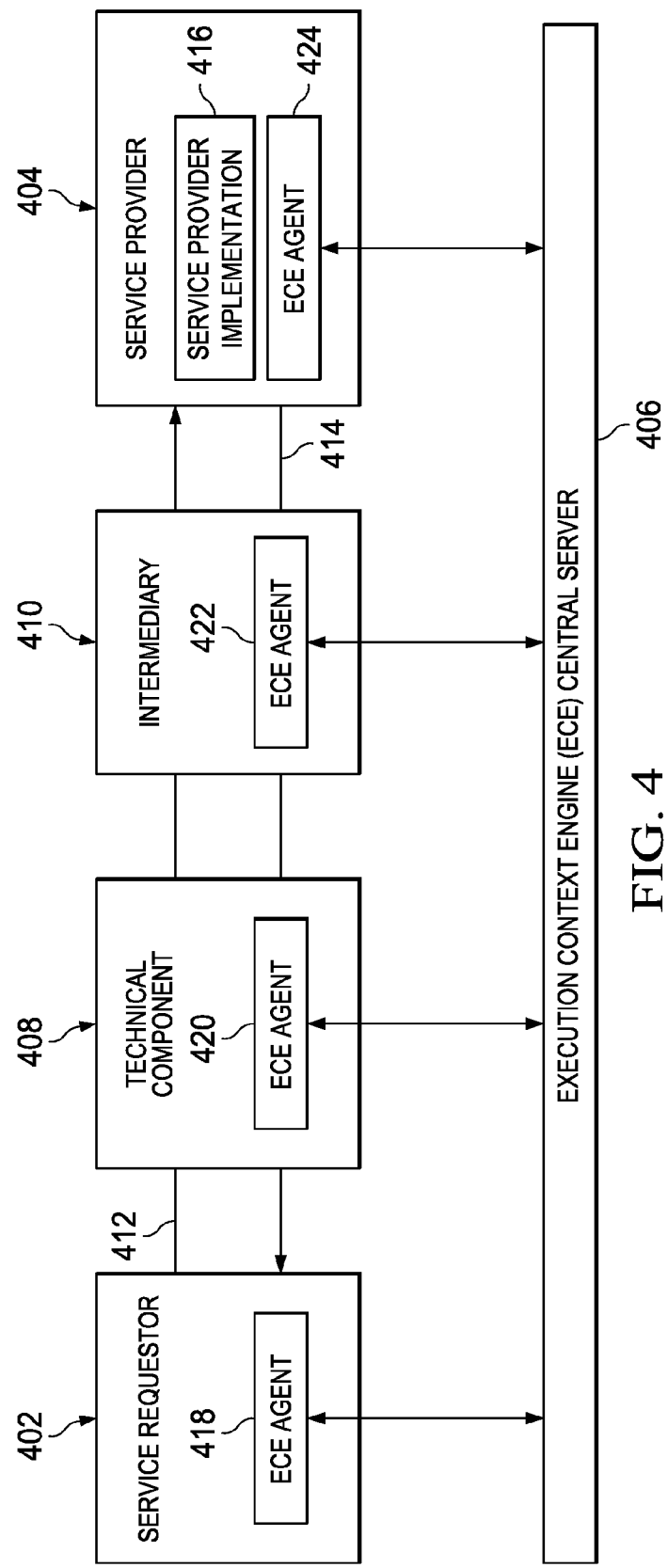
FIG. 4 is a block diagram of exemplary components comprising a Service Oriented Architecture for selecting a business service implementation based on an execution context in accordance with the illustrative embodiments.

FIG. 4 is a block diagram of exemplary components comprising a Service Oriented Architecture for selecting a service provider implementation based on an execution context in accordance with the illustrative embodiments. The execution context comprises knowledge about both the business aspects and the operational aspects as related to the current business process and the service being requested. Examples of the business aspects in the execution context include, but are not limited to, the current business process and the service being requested, the level of importance and priority of the current business process and the service, the desired quality of service, key performance indicators, and performance metrics. The business aspects also may include business related heuristic control values that are used and updated by the various components illustrated in FIG. 4 during service transmission and execution. Examples of the operational aspects in the execution context include, but are not limited to, the current response time of the service and/or the average response time of the service requests within the process, the current routing parameters within the system for the execution of the current service and/or business process, and the availability characteristics of the current business process and/or the service. Operational aspects may also include heuristic control values affecting the performance and availability that are used and updated by the various components during service transmission and execution. The execution context travels with the service request and response. The execution context may be used and manipulated dynamically by various technical components and intermediary in the path to a service provider, and by the service provider that processes the service request and response in order to determine the particular service provider implementation to select for processing the request. The execution context is manipulated based on intelligence that is maintained in a distributed fashion throughout the execution environment.

In this illustrative example, Service Oriented Architecture comprises a service requester 402, service provider 404, execution context engine central server 406, technical component 408, and intermediary 410. The components shown in FIG. 4 are intended as an example, and not as an architectural limitation for the different illustrative embodiments. For instance, Service Oriented Architecture may comprise a plurality of technical components 408.

Service requester 402 refers to any software program that invokes a business process that is exposed as a service and/or a business service that is part of the business process. Service requester 402 requests a service by sending service request object 412 to a service provider, and receiving the response to the request via a service response object 414. An execution context is first created by service requester 402 with the aid of the execution context engine. Specifically, when creating a service request, the service requestor sends a request to local execution context engine agent 418 to create the execution context for the service request. Execution context engine agent 418 communicates with execution context engine central server 406 to obtain historical execution context information about the business process and service being processed, and then creates the execution context based on information collected by the agent about the business process and service being processed and the size of the resources, as well as the historical execution information obtained from the execution context engine central server 406. Execution context engine agent 418 then provides the execution context to the service requestor to pass with the service request to the next component in the path, or technical component 408 in this example.

The execution context engine is implemented as a central server 406 and a set of distributed agents 418-424. The execution context engine central server 406 maintains a master copy of a historical information database that is constantly updated by the agents based on their past history of processing service requests. The historical information database comprises execution context information collected from the distributed agents for previously processed service requests. The distributed agents of the execution context engine implement various algorithms that update the heuristic control values in an execution context passed with a request based on both the business information and operational information in the execution context, and in the historical execution context information maintained at execution context engine central server 406. The distributed agents of the execution context engine may also implement self-learning algorithms that constantly improve the accuracy of their decision making. The agents use these algorithms to improve their service provider implementation selection intelligence based on the results of their processing of previous service requests.

Distributed agents 418-424 are co-located with the various entities that manipulate the execution context (e.g., service requester 402, service provider 404, technical component 408, and intermediary 410). When a service request is created, an agent creates an execution context. Subsequent agents in the request flow examine both the current processing information about the business process and service being collected and updated along the flow path and the historical context information about the business process and service in the central engine to make a service implementation decision. Once the agent makes a decision, the agent routes the request appropriately and updates the central database with any additional knowledge they are collecting to make the decision.

An agent may create an execution context comprising heuristic control values based on (1) the business process being executed, (2) the service being processed, (3) the historical execution context information, and (4) the size of the resources required to provide the service. When an execution context for a service request flowing through the infrastructure has already been created, an agent may update the heuristic control values in the existing execution context in the service request by executing an algorithm that determines new sets of heuristic control values for the execution context based on the information collected by the agent about the business process or service currently being processed. This information may include the processing time spent so far, the expected service level of the current process and service, and the degree of caching along the execution path.

Agents 418-424 retain a cache copy of the part of the historical execution context information database that is relevant to the component they support and are collocated with. Agents 418-424 communicate with the execution context engine central server 406 to obtain the cache copy of the historical execution context information about the current business process and service from the central server historical execution context database. Thus, historical execution context information may be propagated from execution context engine central server 406 to agents 418-424. Agents 418-424 also communicate with the execution context engine central server 406 to update or refresh the historical execution context information stored at the central server with execution context information collected by the agents from processing the current service request. This updated historical information at the central server may then be propagated to or retrieved by other distributed agents, which use the historical information to create or update the execution context passed with the service request.

Technical component 408 refers to the various hardware and/or software components that allow service requests to be processed. Technical component 408 does not execute the functionality provided by the service. Rather, technical component 408 provides technical functions in support of the service. Examples of a technical component include, but are not limited to, a caching component, logging component, service invoker component, among others. Technical component 408 uses the information in the execution context passed in the service request and the historical execution context information stored at the execution context engine central server to make optimal execution decisions. For instance, if the execution context indicates that the current business process has very stringent key performance indicators (KPI), local execution context engine agent 420 located with technical component 408 may decide to forward the service request to a service provider that has a higher million instructions per second (MIPS) rate and a lower service utilization level.

Upon receiving the execution context passed with a service request, technical component 408 invokes local execution context engine agent 420 which collects information about the business process or service currently being processed. Technical component 408 may then make an execution decision based on the historical execution context information obtained by the agent from the execution context engine central server database and the current execution context information about the service being collected as the service request flows through the infrastructure. For example, if technical component 408 is an aggregator technical component, information in the execution context may prompt technical component 408 to break the request into multiple parallel requests and assemble the result. Local execution context engine agent 420 may then perform one or more of the following actions. Local execution context engine agent 420 may update the historical database at the execution context engine central server 406 with the execution context processing information collected by the agent. Local execution context engine agent 420 may execute intelligent algorithms in order to determine new sets of heuristic control values for the execution context passed with the service request to the next component in the path. Local execution context engine agent 420, with execution context engine central server 406, may also execute self-learning algorithms to improve the heuristic model based on the execution context information received from the agent during lull periods. Technical component 408 then passes the request with the updated execution context with the service request to the next component in the path, or intermediary 410 in this example.

Intermediary 410 is an entity that determines which service provider implementation to send the service request. Examples of an intermediary include an Enterprise Service Bus (ESB) or a business process engine, among others. When intermediary 410 receives a service request, intermediary 410 may invoke local execution context engine agent 422 which collects information about the business process or service currently being processed. Intermediary 410 may then use the information in the execution context passed in the service request and the historical execution context information the agent retrieves from the execution context engine central server database to make optimal execution decisions. For example, intermediary 410 may forward the request to a different service provider implementation based on the information in the execution context.

Local execution context engine agent 422 may then update the historical database at the execution context engine central server 406 with service processing information collected by the agent, execute intelligent algorithms in order to determine new sets of heuristic control values for the execution context passed with the service request to the next component in the path, and/or execute self-learning algorithms with the execution context engine central server during lull periods to improve the heuristic model based on the execution context information received from the agent. Intermediary 410 then passes the service request with the updated execution context to the next component in the path, or service provider 404 in this example.

Service provider 404 publishes a service through a service interface. Service provider 404 deploys an implementation of the requested service, or service provider implementation 416, to service requester 404. Service provider implementation 416 refers to the software that implements the service being invoked. Service provider implementation 416 may be implemented in a variety of ways, such as by a business process execution engine, a custom developed code, or as a wrapper of an existing legacy system.

Service provider implementation 416 uses the information in the execution context in order to execute a particular code path within its implementation. Thus, the service provider implementation may determine which code within the implementation to execute based on the information in the execution context. For example, if the execution context indicates that the performance of the current business process is low and that the infrastructure is saturated, service provider implementation 416 may generate and return a summary list in the response message comprising of the basic information about the selected items. This summary list may be provided in a subsequent call, say by a business process choreograph engine executed by the process server or an ESB, to the service provider for obtaining detailed information. The response time may be improved by presenting the summary information to the user and by obtaining the detailed information while the user is perusing the summary information. The local agent at the Service provider implementation 416 may also update the execution context so that the business process choreograph engine or an ESB may invoke subsequent requests to obtain the information in the summary list.

FIG. 5 is a flowchart of a process for optimally selecting a business service implementation and optimizing the service execution dynamically based on an execution context in accordance with the illustrative embodiments. The process may be implemented using Service Oriented Architecture in FIG. 4.

The process begins when a service requester sends a request for a service through a service interface (step 502). The service requester also sends a request to the local execution context engine agent co-located with the service requester to create an execution context (step 504).

Upon receiving the request for the execution context, the execution context engine agent at the service requester creates the execution context based on business aspects and the operational aspects as related to the current business process and the service being requested (step 506). The execution context may include various heuristic control values, such as the business process currently being processed, the service currently being processed, the historical execution information about the business process and service, and the size of the resources needed to process the service request. The execution context engine agent periodically communicates with the execution context engine central server to obtain the historical execution context information from the central server database. The execution context engine agent also communicates with the execution context engine central server to provide update information collected by the agent to the execution context engine server to update the central database. This update information comprises information about processing of the business process and service that the agent may provide gathered using self-learning algorithms. The agents use these self-learning algorithms to improve their service provider implementation selection intelligence based on the results of their processing of previous service requests. The execution context engine agent then provides the execution context to the service requester (step 508).

When the service requester receives the execution context from the execution context engine agent, the service requester forwards the service request comprising the created execution context to an intermediary (e.g., an Enterprise Service Bus, a business process engine, etc.), a technical component (e.g., a load balancer, caching component, etc.), or a service provider (step 510). When the intermediary, technical component, or service provider receives the request along with the execution context, the intermediary, technical component, or service provider utilizes the information in the execution context to make optimal execution decisions (step 512). The intermediary, service provider, or technical component makes the execution decision based on the historical execution context information about the current business process and service and the current execution context information about the business process and service being collected by local agents as the request flows through the infrastructure. For example, a service provider may decide to take a different execution path within its service implementation, or may provide limited information. An intermediary may decide to forward the request to a different service provider implementation. An aggregator technical component may decide to break the request into multiple parallel requests and assemble the result.

After the request is processed by the intermediary, technical component, or service provider, the local execution context engine agent may execute one or more of the following steps: (1) the local execution context engine agent updates the execution context information in the historical database with the current execution context information collected by the agent (step 514), (2) the local execution context engine agent executes the intelligent algorithms in determining the new sets of heuristic values for the execution context and updates the current execution context passed with the request (step 516), and (3) during lull periods, the local execution context engine agent (along with the execution context engine server) executes self-learning algorithms to improve the accuracy of the heuristic model (the service provider implementation selection intelligence) based on the results of the processing of previous service requests (step 518).

The intermediary, technical component, or service provider receives the updated execution context from the local execution context engine agent (step 520). The intermediary, technical component, or service provider then passes the request with the updated execution context along to the next intermediary, next technical component, or the service provider based on the service flow (step 522).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a service oriented architecture for dynamically selecting a business service execution in a service request/response flow based on an execution context, the computer implemented method comprising:

responsive to a first component generating a request for a service, creating, by an execution context engine agent located at the first component, an execution context, wherein the execution context comprises information about business aspects and operational aspects of the service being requested, and wherein the execution context engine agent is part of an execution context engine comprising a central server and a plurality of execution context engine agents distributed within components that send and receive the request in the service request/response flow;

sending, by a processing unit in the first component, the request with the execution context created by the execution context engine agent located at the first component to a second component in the service request/response flow in the service oriented architecture;

responsive to the second component receiving the request, examining, by an execution context engine agent located at second component, the execution context passed with the request, wherein the examining comprises collecting current execution context information about the service based on a current processing of the request for the service by the second component and obtaining historical execution context information about the service based on previous processing of requests for the service stored in a memory of the central server of the execution context engine;

making, by a processing unit in the second component, a service execution decision based on the current execution context information and the historical execution context information; and responsive to the second component making a service execution decision based on the current execution context information and the historical execution context information, updating the execution context in the request with the current execution context information and the historical execution context information, wherein the updated execution context is passed to a third component in the service request/response flow in the service oriented architecture, and updating the historical execution context information in the central server of the execution context engine with the current execution information collected by the execution context engine agent located at second component.

2. The computer implemented method of claim 1, further comprising:
repeating the sending, examining, making, and updating steps for each subsequent component in the service request/response flow.

3. The computer implemented method of claim 1, further comprising:
responsive to making a service execution decision based on the current execution context information and the historical execution context information, executing self-learning algorithms based on previous processing of service requests to improve accuracy of the service execution decision.

4. The computer implemented method of claim 1, wherein the execution context comprises information about the business process and service being requested, historical execution information about the business process and service, and a size of resources required to process the request.

5. The computer implemented method of claim 4, wherein the business aspects in the execution context include at least one of information about the business process and service being requested, level of importance and priority of the service, desired quality of service, key performance indicators, performance metrics, or heuristic control values.

6. The computer implemented method of claim 4, wherein the operational aspects in the execution context include at least one of current response times of the service, average response times of the requests for the service, current routing parameters for execution of the business process, current routing parameters for execution of the service, availability characteristics of the business process, availability characteristics of the service, or heuristic values affecting service performance and availability.

7. The computer implemented method of claim 1, wherein a service provider implementation uses the execution context to make a service execution decision comprising selection of a particular code path within its implementation to execute.

8. The computer implemented method of claim 1, wherein the second component is an enterprise service bus.

9. The computer implemented method of claim 8, wherein the service execution decision made by the enterprise service bus comprises a selection of a service provider implementation for the requested service.

10. The computer implemented method of claim 1, wherein the third component is a technical component providing caching, logging, or service invoking support functions for the service requested.

11. The computer implemented method of claim 1, wherein the third component is an aggregator technical component, and wherein the service execution decision made by the technical component comprises divides the request into multiple parallel requests and aggregates results of processing the multiple parallel requests.

12. The computer implemented method of claim 1, wherein the third component is a service provider.

13. A data processing system in a service oriented architecture for dynamically selecting a business service execution in a service request/response flow based on an execution context, the data processing system comprising:
an execution context engine comprising a (i) central server comprising a data processor and (ii) plurality of execution context engine agents distributed within components that send and receive the request in the service request/response flow;
a first component in the service request/response flow comprising a first execution context engine agent in the plurality of execution context engine agents;
a second component in the service request/response flow comprising a second execution context engine agent in the plurality of execution context engine agents;
a third component in the service request/response flow comprising a third execution context engine agent in the plurality of execution context engine agents;
wherein in response to a processing unit in the first component generating a request for a service, the first execution context engine agent in the first component creates an execution context comprising information about business aspects and operational aspects of the service being requested;
wherein in response to the second component receiving, from the first component, the request comprising the execution context, the second execution context engine agent examines the execution context passed with the request by collecting current execution context information about the service based on a current processing of the request for the service by the second component and obtains historical execution context information about the service based on previous processing of requests for the service stored in a memory of the central server of the execution context engine;
wherein the second component makes a service execution decision based on the current execution context information and the historical execution context information;
wherein the second component updates the execution context in the request with the current execution context information and the historical execution context information to form an updated execution context and updates the historical execution context information in the central server of the execution context engine with the current execution information collected by the execution context engine agent located at second component; and wherein the third component receives, from the second component, the request comprising the updated execution context.

14. A computer program product in a service oriented architecture for dynamically selecting a business service execution in a service request/response flow based on an execution context, the computer program product comprising:

a non-transitory computer usable storage medium having computer usable program code stored thereon, the computer usable program code comprising:

computer usable program code for creating an execution context in response to a first component generating a request for a service, wherein the execution context comprises information about business aspects and operational aspects of the service being requested, and wherein the execution context engine agent is part of an execution context engine comprising a central server and a plurality of execution context engine agents distributed within components that send and receive the request in the service request/response flow;

computer usable program code for sending the request with the execution context created by the execution context engine agent located at the first component to a second component in the service request/response flow in the service oriented architecture;

computer usable program code for, in response to the second component receiving the request, examining the execution context passed with the request by an execution context engine agent located at second component, wherein the examining comprises collecting current execution context information about the service based on a current processing of the request for the service by the second component and obtaining historical execution context information about the service based on previous processing of requests for the service stored in a memory of the central server of the execution context engine;

computer usable program code for making a service execution decision by the second component based on the current execution context information and the historical execution context information, and computer usable program code for, in response to the second component making a service execution decision based on the current execution context information and the historical execution context information, updating the execution context in the request with the current execution context information and the historical execution context information, wherein the updated execution context is passed to a third component in the service request/response flow in the service oriented architecture, and updating the historical execution context information in the central server of the execution context engine with the current execution information collected by the execution context engine agent located at second component.

15. The computer program product of claim 14, further comprising:

computer usable program code for repeating the sending, examining, making, and updating steps for each subsequent component in the service request/response flow.

16. The computer program product of claim 14, further comprising:

computer usable program code for executing self-learning algorithms based on previous processing of service requests to improve accuracy of the service execution decision in response to making a service execution decision based on the current execution context information and the historical execution context information.

* * * * *